(12) United States Patent
Liu et al.

(10) Patent No.: US 10,425,203 B2
(45) Date of Patent: Sep. 24, 2019

(54) DATA TRANSMISSION METHOD AND APPARATUS

(71) Applicant: Huawei Technologies Co., Ltd., Shenzhen (CN)

(72) Inventors: Sheng Liu, Shenzhen (CN); Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 15/474,589

(22) Filed: Mar. 30, 2017

(65) Prior Publication Data

US 2017/0207890 A1 Jul. 20, 2017

Related U.S. Application Data

(63) Continuation of application No. PCT/CN2014/091335, filed on Nov. 18, 2014.

(30) Foreign Application Priority Data

Sep. 30, 2014 (WO) ................ PCT/CN2014/088054

(51) Int. Cl.
*H04W 84/12* (2009.01)
*H04L 5/00* (2006.01)
(Continued)

(52) U.S. Cl.
CPC ............ *H04L 5/0044* (2013.01); *H04L 5/001* (2013.01); *H04L 27/2602* (2013.01); *H04W 56/00* (2013.01); *H04W 84/12* (2013.01)

(58) Field of Classification Search
CPC ..... H04W 84/12; H04W 80/04; H04W 84/18; H04W 88/06; H04W 74/08
See application file for complete search history.

(56) References Cited

U.S. PATENT DOCUMENTS 7,453,793 B1\* 11/2008 Jones, IV ............ H04L 25/0216
370/203
2005/0084030 A1 4/2005 Zhou et al.
(Continued)

FOREIGN PATENT DOCUMENTS

CN 1630283 A 6/2005
CN 101431803 A 5/2009
(Continued)

OTHER PUBLICATIONS

"IEEE Standard for Information technology—telecommunications and information exchange between systems Local and metropolitan area networks—Specific requirements; Part 11: Wireless LAN Medium Access Control (MAC) and Physical Layer (PHY) Specifications," IEEE Computer Society, IEEE Std 802.11-2012, Institute of Electrical and Electronics Engineers, New York, New York (Mar. 29, 2012).

(Continued)

*Primary Examiner* — Michael J Moore, Jr.
*Assistant Examiner* — Prenell P Jones
(74) *Attorney, Agent, or Firm* — Leydig, Voit & Mayer, Ltd.

(57) ABSTRACT

A method includes: generating a physical layer packet of a first protocol version of a wireless local area network, where a first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first (Continued)

signal segment in sequence; and sending the physical layer packet to a receive end device, so that the receive end device performs recognition.

20 Claims, 10 Drawing Sheets

(51) Int. Cl.
*H04W 56/00* (2009.01)
*H04L 27/26* (2006.01)

(56) References Cited

U.S. PATENT DOCUMENTS

| | | | |
|---|---|---|---|
| 2006/0018268 A1* | 1/2006 | Kakani | H04W 28/06 370/278 |
| 2007/0014258 A1* | 1/2007 | Tanaka | H04B 7/0848 370/329 |
| 2010/0046464 A1* | 2/2010 | Kwak | H04L 5/0053 370/330 |
| 2010/0118834 A1 | 5/2010 | Kalhan | |
| 2011/0103494 A1 | 5/2011 | Ahmadi | |
| 2014/0016653 A1 | 1/2014 | Oh et al. | |
| 2014/0086168 A1 | 3/2014 | Bao et al. | |
| 2014/0185483 A1* | 7/2014 | Kim | H04W 24/02 370/252 |
| 2015/0195112 A1 | 7/2015 | Jones, IV et al. | |
| 2016/0234858 A1 | 8/2016 | Bao et al. | |

FOREIGN PATENT DOCUMENTS

| | | |
|---|---|---|
| CN | 101541078 A | 9/2009 |
| CN | 101542942 A | 9/2009 |
| CN | 102299892 A | 12/2011 |
| CN | 102316583 A | 1/2012 |
| CN | 102835061 A | 12/2012 |
| CN | 103037520 A | 4/2013 |
| CN | 103493525 B | 6/2016 |
| WO | WO 2012040495 A1 | 3/2012 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz," IEEE Computer Society, IEEE Std 802.11ac-2013, Institute of Electrical and Electronics Engineers, New York, New York (2013).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEEE Std 802.11n-2009, Institute of Electrical and Electronics Engineers, New York, New York (Oct. 29, 2009).

Lee et al., "802.11ac preamble for VHT auto-detection," IEEE802.11-10/0628r1, pp. 1-24, XP17676873, Institute of Electrical and Electronics Engineers, New York, New York (May 20, 2010).

\* cited by examiner

DATA TRANSMISSION METHOD AND APPARATUS

CROSS-REFERENCE TO RELATED APPLICATIONS

This application is a continuation of International Patent Application No. PCT/CN2014/091335, filed on Nov. 18, 2014, which claims priority to International Patent Application No. PCT/CN2014/088054, filed on Sep. 30, 2014. The disclosures of all the aforementioned applications are hereby incorporated by reference in their entireties.

TECHNICAL FIELD

Embodiments of the disclosure relate to the communications field, and more specifically, to a data transmission method and apparatus.

BACKGROUND

An existing wireless local area network (WLAN) standard that is based on an orthogonal frequency division multiplexing (OFDM) technology includes gradually evolving versions such as 801.11a, 802.11n, and 802.11ac. In an existing WLAN system based on the 802.11a, 802.11n, and 802.11ac standards, a length of a used OFDM symbol is 4 μs, including a cyclic prefix (CP) or a guard interval (GI) of 0.8 μs.

802.11a, 802.11n, and 802.11ac packets each begin with a legacy preamble according to a time sequence, and the legacy preamble further includes three parts: an L-STF (legacy short training field), an L-LTF (legacy long training field), and an L-SIG (legacy signal field). The L-SIG includes two pieces of indication information, that is, a rate and a length, the rate indicates one of eight types of rates defined in the 802.11a protocol, and each type of rate is corresponding to a different modulation and coding format, and the length indicates an amount of transmitted data in the packet with a unit of an octet. In the 802.11a, 802.11n, and 802.11ac packets, the legacy preamble is closely followed by a data field, an HT-SIG field (high throughput signal field), and a VHT-SIG-A field (very high throughput signal-A field) respectively, where the HT-SIG and the VHT-SIG-A each include two OFDM symbols and have a length of 8 μs. By using different modulation schemes, the 802.11a, 802.11n, and 802.11ac standards may well coexist in a same WLAN.

Currently, the IEEE 802.11 standardization organization has started standardization work of a new generation WLAN standard 802.11ax called an HEW (High Efficiency WLAN, high efficiency wireless local area network). OFDMA and uplink MU-MIMO are two main key technologies of the 802.11ax standard. Therefore, a solution is expected to enable 802.11ax devices to be well recognized by each other in a WLAN.

SUMMARY

Embodiments of the disclosure provide a data transmission method and apparatus, so that 802.11ax devices can be well recognized by each other in a WLAN.

According to a first aspect, a method is provided, including: generating a physical layer packet of a first protocol version of a wireless local area network, where the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and sending the physical layer packet to a receive end device, so that the receive end device performs recognition.

According to a second aspect, a method is provided, including: receiving a physical layer packet that is of a first protocol version of a wireless local area network and that is sent by a transmit end device, where the physical layer packet is generated by the transmit end device, the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and performing recognition on the physical layer packet.

According to a third aspect, an apparatus is provided, including: a generation module, configured to generate a physical layer packet of a first protocol version of a wireless local area network, where the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and a sending module, configured to send the physical layer packet to a receive end device, so that the receive end device performs recognition.

According to a fourth aspect, an apparatus is provided, including: a receiving module, configured to receive a physical layer packet that is of a first protocol version of a wireless local area network and that is sent by a transmit end device, where the physical layer packet is generated by the transmit end device, the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and a recognition module, configured to perform recognition on the physical layer packet.

In the embodiments of the disclosure, a first bit sequence is determined, a physical layer packet is generated according to the first bit sequence, and the physical layer packet is sent to a receive end. A preamble field of the physical layer packet has two same consecutive target four-segment-structures; therefore, 802.11ax devices are well recognized by each other in a WLAN.

BRIEF DESCRIPTION OF DRAWINGS

To describe the technical solutions in the embodiments of the disclosure more clearly, the following briefly describes the accompanying drawings required for describing the embodiments of the disclosure. Apparently, the accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and completely describes the technical solutions in the embodiments of the disclosure with reference to the accompanying drawings in the embodiments of the disclosure. Apparently, the described embodiments are some but not all of the embodiments of the disclosure. All other embodiments obtained by a person of ordinary skill in the art based on the embodiments of the disclosure without creative efforts shall fall within the protection scope of the disclosure.

Figure 1:
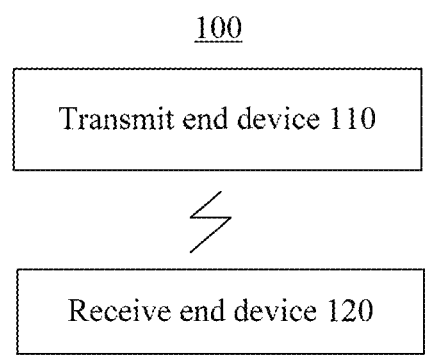
FIG. 1 is a schematic structural diagram of a data transmission system according to an embodiment of the disclosure.

FIG. 1 is a schematic structural diagram of a data transmission system according to an embodiment of the disclosure. The system in FIG. 1 includes a transmit end device 110 and a receive end device 120, where the transmit end device 110 and the receive end device 120 may be a user station (STA, Station) or an access point (AP, Access Point).

A technical solution of the disclosure may be applied to various communications systems in which a preamble is required to notify a communication peer end of information such as a data rate and a data length of transmitted data, for example, a wireless local area network (WLAN, Wireless Local Area Network) system and a Wireless Fidelity (Wi-Fi, Wireless Fidelity) system.

Correspondingly, a transmit end may be a STA in a WLAN, and the user station may also be referred to as a system, a user unit, an access terminal, a mobile station, a mobile station, a remote station, a remote terminal, a mobile device, a user terminal, a terminal, a wireless communications device, a user agent, a user apparatus, or UE (user equipment). The STA may be a cellular phone, a cordless phone, a SIP (Session Initiation Protocol) phone, a WLL (wireless local loop) station, a PDA (personal digital assistant), a handheld device or a computing device with a wireless local area network (such as Wi-Fi) communication function, or another processing device connected to a wireless modem.

In addition, the transmit end may also be an AP in the WLAN, and the access point may be configured to communicate with an access terminal by using the wireless local area network, and transmit data of the access terminal to a network side, or transmit data from the network side to the access terminal.

For ease of understanding and description, as an example instead of a limitation, an execution process and action of a data transmission method and apparatus of the disclosure in a Wi-Fi system are described in the following.

Figure 2:
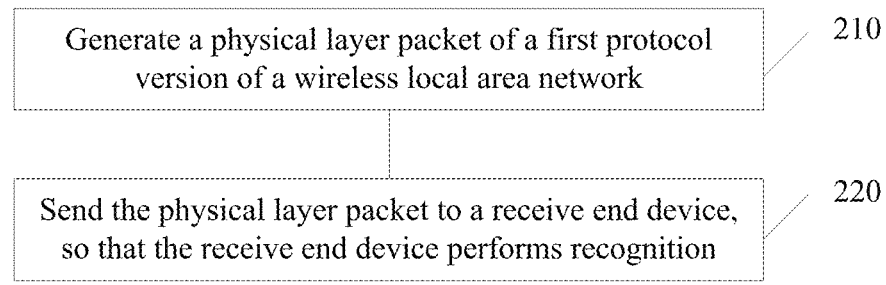
FIG. 2 is a schematic flowchart of a data transmission method according to another embodiment of the disclosure.

FIG. 2 is a schematic flowchart of a data transmission method according to another embodiment of the disclosure. The method in FIG. 2 includes the following steps:

210. Generate a physical layer packet of a first protocol version of a wireless local area network, where the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence.

220. Send the physical layer packet to a receive end device, so that the receive end device performs recognition.

Figure 2A:
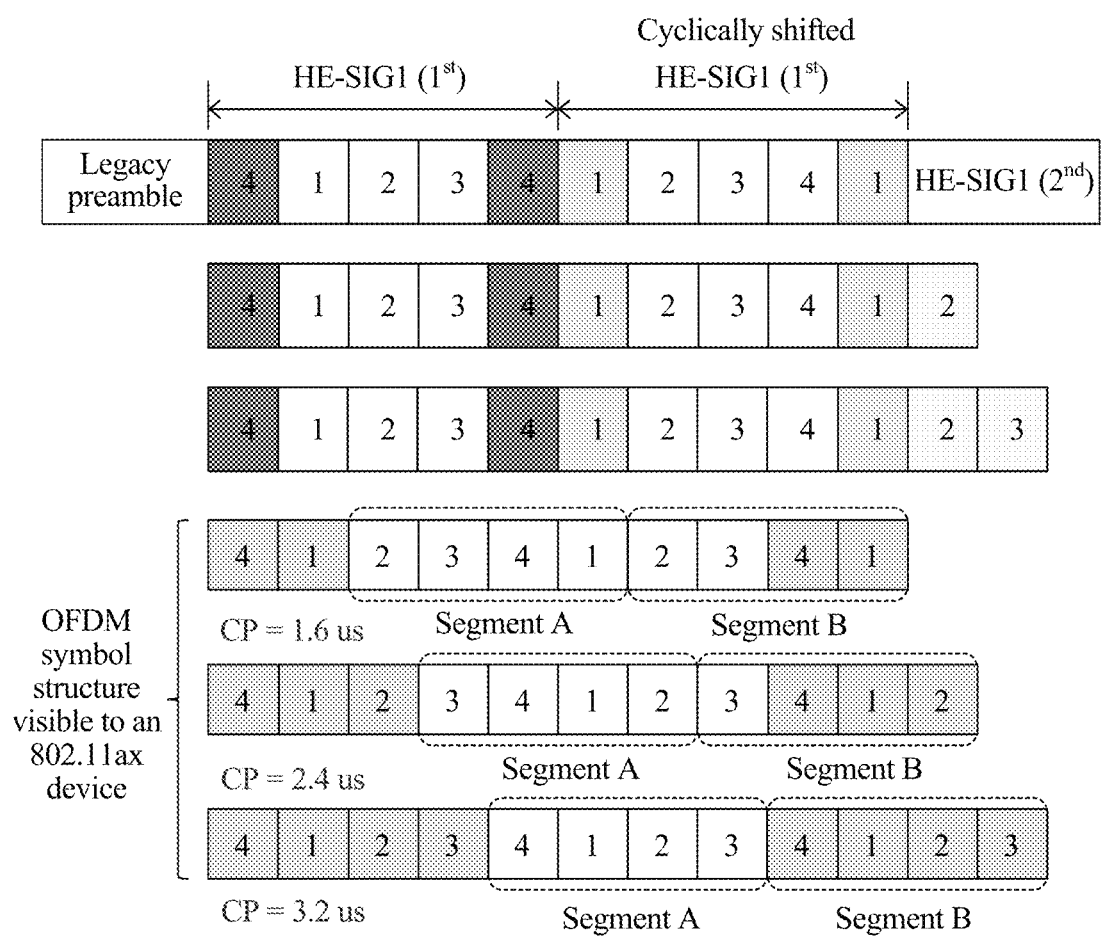
FIG. 2A is a schematic diagram of a first signaling field of a physical layer packet according to another embodiment of the disclosure.

It should be understood that, the first protocol version is a later protocol version, for example, a version of an 802.11ax device. The second protocol version is an earlier protocol version, for example, versions used by 802.11a, 802.11n, and 802.11ac devices. As shown in FIG. 2A, for ease of description, the first OFDM symbol of the first signaling field is expressed as HE-SIG1($1^{st}$), and the second OFDM symbol of the first signaling field is a cyclic shift copy of HE-SIG1($1^{st}$). The first signal segment, the second signal segment, the third signal segment, and the fourth signal segment are respectively corresponding to segments 1, 2, 3, and 4 in the figure. A sequence in a first line in FIG. 2A is two OFDM symbols, and a length of each symbol is 4 microseconds; therefore, a length of the segment is 0.8 microseconds. For example, when a signal is generated, the fourth signal segment is copied and is placed before the first signal segment, so as to form a symbol constituted by a 41234 sequence. In addition, the first signaling field following the legacy preamble may be adjacent to the legacy preamble, or may be not adjacent to the legacy preamble.

It should be further understood that, following the second OFDM symbol, the first signaling field may further include one or more OFDM symbols. In addition, the first signal segment, the second signal segment, the third signal segment, and the fourth signal segment, a fifth signal segment, a sixth signal segment, a seventh signal segment, and an eighth signal segment in the specification are unit signal segment of 0.8 microseconds. A multiple-signal-segment refers to a signal that includes multiple unit signal segments. A two-signal-segment refers to a signal that includes two unit signal segments. A four-signal-segment refers to a signal that includes four unit signal segments. A first four-signal-segment and a second four-signal-segment are used to distinguish different four-signal-segments. A target four-signal-segment in the specification is also a four-signal-segment, and is specifically a four-signal-segment recognized and determined by a receive end. The target four-signal-segment may be the same as or may be different from the first four-signal-segment or the second four-signal-segment.

In this embodiment of the disclosure, a first bit sequence is determined, a physical layer packet is generated according to the first bit sequence, and the physical layer packet is sent to a receive end. A preamble field of the physical layer packet has two same consecutive target four-segment-structures; therefore, 802.11ax devices are well recognized by each other in a WLAN.

In addition, two repeated four-segment-structures are removed, so that there exists a prefix that has at least two signal segments; therefore, interference between symbols may be better reduced.

According to this embodiment of the disclosure, the sending the physical layer packet to a receive end device, so that the receive end device performs recognition includes: sending the physical layer packet to the receive end device, so that the receive end device determines two same consecutive target four-signal-segments in the first signaling field.

It should be understood that, in this embodiment of the disclosure, a part following the legacy preamble is referred to as a specific HE preamble, that is, an HE-SIG1 field is a start part of the HE preamble, and the first signaling field is a start part of the HE-SIG1 field. The first signaling field may include a suffix, or may not include a suffix. For ease of description, the numbers in FIG. 2A are still used to express signal segments, where the two same consecutive target four-signal-segments may include four cases: 12341234, 23412341, 34123412, and 41234123. Target four-signal-segments are different because of different suffixes.

According to this embodiment of the disclosure, the first signaling field further includes a suffix, where the suffix is adjacent to the second OFDM symbol, and the suffix is the second signal segment or a cyclic signal segment that includes at least two signal segments, where the cyclic signal segment is based on a circular order of the first signal segment, the second signal segment, the third signal segment, and the fourth signal segment.

Preamble Structure

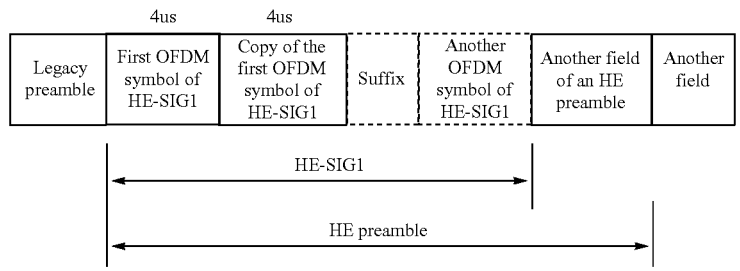

For example, refer to a preamble structure shown above, it should be understood that, the preamble structure is only a case in which the first signaling field following the legacy preamble is adjacent to the legacy preamble. A sequence in a second line in FIG. 2A is a sequence obtained after a signal segment is added to the end of the first line. Signal segments in the sequence are cyclic. A sequence in a third line in FIG. 2A is a sequence obtained after two signal segments are added to the end of the first line. Signal segments in the sequence are cyclic. As shown in sequences in a fourth line to a sixth line in FIG. 2A, correspondingly, when processing the sequence, the receive end may determine two repeated four-segment-structures in the sequence, that is, segment A and segment B in the figure; therefore, 802.11ax devices may be recognized by each other in a wireless local area network. In addition, based on the circular order of the first signal segment, the second signal segment, the third signal segment, and the fourth signal segment, the suffix may further include more signal segments. It should be understood that, in the foregoing circular order of the four signal segments, a signal segment following the fourth signal segment is the first signal segment.

As shown in FIG. 2A, the first OFDM symbol of the HE preamble is a first OFDM symbol of the HE-SIG1 field, that is, HE-SIG1($1^{st}$); first three lines are respectively three embodiments, and in the three embodiments, the second OFDM symbol of the HE preamble is a cyclic shift copy of HE-SIG1($1^{st}$). Specifically, segments 1, 2, 3, and 4 of HE-SIG1($1^{st}$) that does not include a CP are cyclically shifted leftward by 0.8 μs to obtain a signal that consists of segments 2, 3, 4, and 1 in sequence in a time sequence. Afterwards, a 0.8 μs CP is added (that is, a copy of segment 1) to form the second OFDM symbol of the HE preamble, that is, a total 4 μs signal that consists of segments 1, 2, 3, 4, and 1.

A difference among the three embodiments shown in FIG. 2A lies in a suffix following the second OFDM symbol of the HE preamble. When no suffix is added to the second OFDM symbol of the HE preamble, for the 802.11ax device, a total length of a received HE-SIG1($1^{st}$) signal segment is 8 s, in which a length of a CP is 1.6 μs and the CP consists of segments 4 and 1 of HE-SIG1($1^{st}$). After the 1.6 μs CP is removed, the signal segment includes two same signal segments, each of which has a length of 3.2 μs and consists of segments 2, 3, 4, and 1 of HE-SIG1($1^{st}$), that is, two signal segments A and B shown in a sequence in a fourth line in FIG. 2A.

When a suffix whose length is 0.8 μs and that consists of segment 2 of HE-SIG1($1^{st}$) is added following the second OFDM symbol of the HE preamble, for the 802.11ax device, a total length of a received HE-SIG1($1^{st}$) signal segment is 8.8 μs, in which a CP length is 2.4 μs and the CP consists of segments 4, 1, and 2 of HE-SIG1($1^{st}$). After the 2.4 μs CP is removed, the signal segment includes two same signal segments, each of which has a length of 3.2 μs and consists of segments 3, 4, 1, and 2 of HE-SIG1($1^{st}$), that is, two signal segments A and B shown in a sequence in a fifth line in FIG. 2A.

When a suffix whose length is 1.6 μs and that consists of segments 2 and 3 of HE-SIG1($1^{st}$) is added following the second OFDM symbol of the HE preamble, for the 802.11ax device, a total length of a received HE-SIG1($1^{st}$) signal segment is 9.6 us, in which a CP length is 3.2 μs and the CP consists of segments 4, 1, 2, and 3 of HE-SIG1($1^{st}$). After the 3.2 μs CP is removed, the signal segment includes two same signal segments, each of which has a length of 3.2 μs and consists of segments 4, 1, 2, and 3 of HE-SIG1($1^{st}$), that is, two signal segments A and B shown in a sequence in a sixth line in FIG. 2A.

According to this embodiment of the disclosure, the generating a physical layer packet of a first protocol version of a wireless local area network includes: generating a first four-signal-segment, where the first four-signal-segment consists of the first signal segment, the second signal segment, the third signal segment, and the fourth signal segment in sequence; performing cyclic shift processing on the first four-signal-segment, to obtain a shifted four-signal-segment, where the shifted four-signal-segment consists of the second signal segment, the third signal segment, the fourth signal segment, and the first signal segment in sequence; determining the first signal segment as a prefix of the shifted four-signal-segment; and generating the first signaling field according to the first four-signal-segment and the shifted four-signal-segment, so as to generate the physical layer packet.

Figures 2B, 2C:
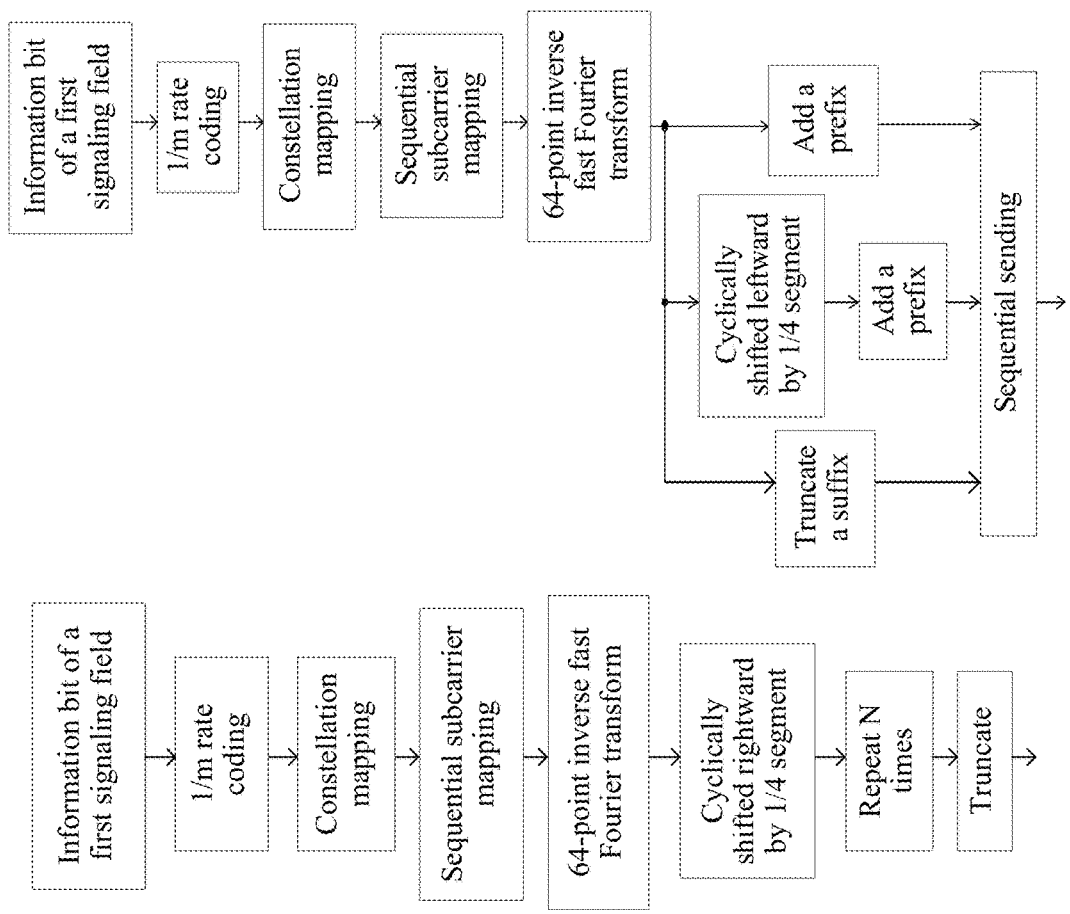
FIG. 2B is a schematic diagram of a generation process of a first signaling field of a physical layer packet according to another embodiment of the disclosure.
FIG. 2C is a schematic diagram of a generation process of a first signaling field of a physical layer packet according to another embodiment of the disclosure.

For example, a generation flowchart shown in FIG. 2B. When the first four-signal-segment is generated, channel coding is first performed on a bit sequence; and then modulation such as binary phase shift keying modulation is performed; and then subcarrier mapping is performed; and then 64-point inverse fast Fourier transform is performed; and then subsequent processing is performed. Specifically, a 41234 structure is obtained by adding a prefix to a 1234 structure, a 12341 structure is obtained by adding a prefix to a 2341 structure, where the 2341 structure is obtained after cyclic shift processing is performed on the 1234 structure; in addition, a suffix structure that includes at least one signal segment may further be added. Finally, the obtained three parts are sent sequentially. It should be understood that, for the 802.11ax device, the suffix structure is not used for suffix removal at the receive end. Instead, the suffix structure is used in a repeated target four-segment-structure detected by the receive end. When the receive end performs signal processing, a prefix is removed, and the removed prefix is determined by a suffix that is used when a signal is generated. For an 802.11a device, the suffix structure is not recognized. In other words, the 802.11a device still processes a signal of the first signaling field as a data signal. When redundancy check fails, the 802.11a device discards a data packet, thereby avoiding channel contention.

FIG. 2 shows a generation process of an HE-SIG1($1^{st}$) signal segment. Channel coding is first performed on a physical layer control information bit sequence of HE-SIG1 ($1^{st}$) transmission at a coding rate of 1/m, where 1<m≤2, for example, convolutional coding with a coding rate of 2/3, or LDPC code with a coding rate of 3/4 may be used. After the channel coding, BPSK constellation mapping (that is, BPSK modulation) is performed on a coded bit sequence, and BPSK modulation signals are respectively corresponding to K subcarriers, where K<64, and the remaining 64−K subcarriers are padded with zero. If a time-domain signal whose length is 3.2 μs and that is output by using the 64-point IFFT is numbered, in a time sequence, as four segments 1, 2, 3, and 4 having a same length of 0.8 μs, a 0.8 μs CP (a copy of the fourth segment) is first added to the time-domain signal whose length is 3.2 μs and that is output by using the 64-point IFFT, so that the first OFDM symbol of the HE preamble is formed; the signal is cyclically shifted leftward by ¼ time length, that is, 0.8 μs, and then a 0.8 μs CP (that is, a copy of the first segment) is added, so that the second OFDM symbol of the HE preamble is formed; in addition, following the second OFDM symbol of the HE preamble, a suffix whose length is 0.8 μs or 1.6 μs or the like may be added (the suffix whose length is 0.8 μs and the suffix whose length is 1.6 μs are respectively a copy of the second segment, and copies of the second and third segments), so that an HE-SIG1($1^{st}$) signal segment in an embodiment shown in FIG. 5 in solution 2 is formed.

According to this embodiment of the disclosure, the generating a physical layer packet of a first protocol version of a wireless local area network includes: generating a first four-signal-segment, where the first four-signal-segment consists of the first signal segment, the second signal segment, the third signal segment, and the fourth signal segment in sequence; performing cyclic shift processing on the first four-signal-segment, to obtain a shifted signal segment, where the shifted signal segment consists of the fourth signal segment, the first signal segment, the second signal segment, and the third signal segment in sequence; replicating the shifted signal segment multiple times to obtain a repeated signal segment, where the repeated signal segment is a consecutive arrangement of multiple shifted signal segments; and generating the first signaling field by performing truncation processing on the repeated signal segment, so as to generate the physical layer packet.

For example, a generation flowchart shown in FIG. 2C. When the first four-signal-segment is generated, channel coding is first performed on a bit sequence; and then modulation such as binary phase shift keying modulation is performed; and then subcarrier mapping is performed; and then 64-point inverse fast Fourier transform is performed to obtain a 1234 signal segment; and then cyclic shift processing is performed to obtain a 4123 signal segment; and then replication processing is performed to obtain a repeated signal segment 412341234123 . . . ; and then truncation processing is performed on the repeated signal segment to remove several signal segments at the end, so as to generate the first signaling field. It should be understood that, when the truncation processing is performed, it is determined whether the first signaling field has a suffix.

FIG. 2C shows another equivalent generation process of an HE-SIG1($1^{st}$) signal segment. Channel coding is first performed on a physical layer control information bit sequence of HE-SIG1($1^{st}$) transmission at a coding rate of 1/m, where 1<m≤2, for example, convolutional coding with a coding rate of 2/3, or LDPC code with a coding rate of 3/4 may be used. After the channel coding, BPSK constellation mapping (that is, BPSK modulation) is performed on a coded bit sequence, and BPSK modulation signals are respectively corresponding to K subcarriers, where K<64, and the remaining 64−K subcarriers are padded with zero. A time-domain signal whose length is 3.2 µs is formed by using the 64-point IFFT, and the time-domain signal is cyclically shifted rightward by ¼ time length, that is, 0.8 µs, to form a signal whose length is 3.2 µs and that consists of segments 4, 1, 2, and 3, and then the signal is repeated N times to form a signal whose length is N×3.2 µs, and typically N=3; finally, a front part or all the signal is truncated from the signal to form the HE-SIG1($1^{st}$) signal segment. For example, a case in which there is no suffix and a case in which a suffix whose length is 0.8 µs is added are respectively corresponding to that front 2½× 3.2 µs and 2¾×3.2 µs signals are truncated from the signal; and for a case in which a suffix whose length is 1.6 µs is added, a signal of 9.6 us is directly used as the HE-SIG1($1^{st}$) signal segment.

According to this embodiment of the disclosure, the preamble further includes a second signaling field that follows and is adjacent to the first signaling field, and the second signaling field includes two same consecutive multiple-signal-segments.

It should be understood that, the second signaling field may further include one or more OFDM symbols following the two same consecutive multiple-signal-segments.

According to this embodiment of the disclosure, the first signaling field and the second signaling field use a same coding scheme.

It should be understood that, the used same coding scheme may be any coding scheme. Preferably, both the first signaling field and the second signaling field use a coding scheme with a coding rate greater than 1/2. Because the two signaling fields may be jointly coded and decoded, both the first signaling field and the second signaling field obtain an SNR gain of 3 dB. Optionally, joint or independent coding is performed, and joint or independent CRC check (Cyclic Redundancy Check, cyclic redundancy check) is performed. In addition, recognition between 802.11ax devices, and error correction strength generated when the 802.11ax device coexists with another device of an earlier version may be further supported.

According to this embodiment of the disclosure, before the two same consecutive multiple-signal-segments, the second signaling field further includes a prefix signal segment, where the prefix signal segment is at least one signal segment at the end of the two same consecutive multiple-signal-segments.

Figure 2D:
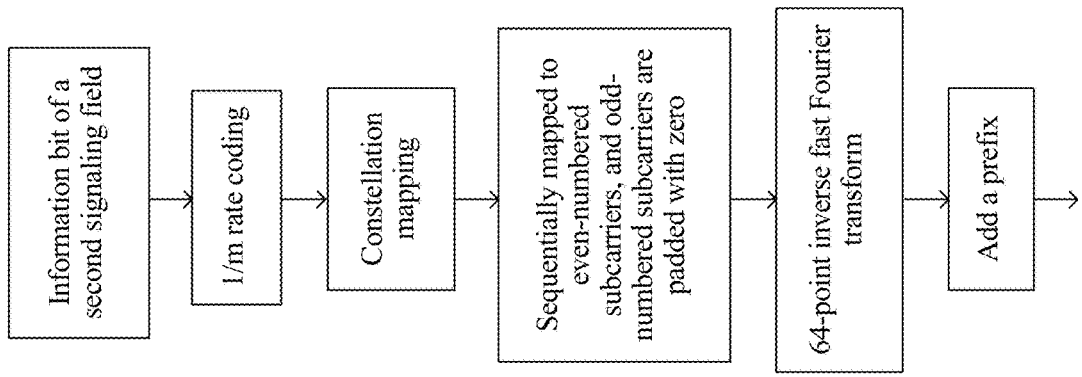
FIG. 2D is a schematic diagram of a second signaling field of a physical layer packet according to another embodiment of the disclosure.

It should be understood that, in this embodiment, the second signaling field is expressed as HE-SIG1($2^{nd}$). In four sequences shown in FIG. 2D, segment C and segment D are two repeated two-segment-structures, and a remaining part in each sequence is a prefix structure. The prefix structure may be one or more signal segments, and if more than two signal segments are used as the prefix, interference between symbols may be effectively reduced. Specifically, In a signal structure of HE-SIG1($2^{nd}$), the symbol has a length of 3.2 µs without a CP, and is equally divided into four segments in terms of time, where first two segments, that is, segment C in the figure, and last two segments, that is, segment D in the figure, are completely the same. Therefore, the four segments in total are respectively numbered with 1, 2, 1, and 2 in a time sequence, and a length of each segment is 0.8 µs. A CP of a different length such as 0.8 µs, 1.6 µs, 2.4 µs, or 3.2 µs may be used.

Figure 2E:
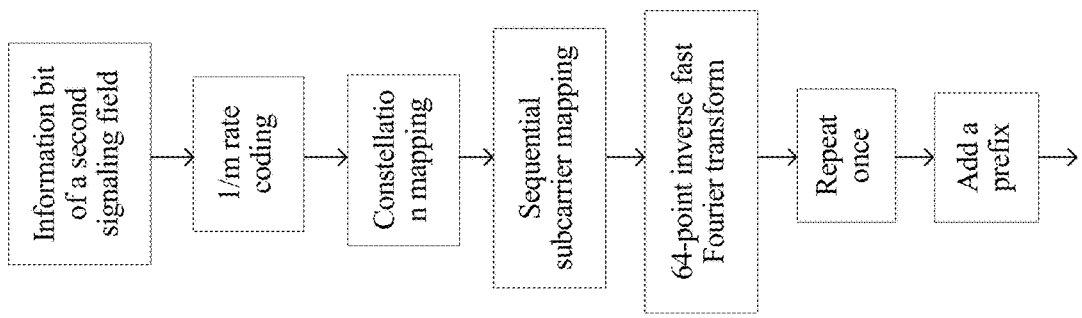
FIG. 2E is a schematic diagram of a second signaling field of a physical layer packet according to another embodiment of the disclosure.

Similarly, in four sequences shown in FIG. 2E, segment C and segment D are two repeated four-segment-structures, and a remaining part in each sequence is a prefix structure. The prefix structure may be one or more signal segments, and likewise, if more than two signal segments are used as the prefix, interference between symbols may be effectively reduced. Specifically, in a signal structure of HE-SIG1($2^{nd}$), the symbol does not include a CP and also has two segments of repeated structures in terms of time, that is, segment C and segment D in the figure, and a length of each segment of the signal is 3.2 µs. A CP of a different length such as 0.8 µs, 1.6 µs, 2.4 µs, or 3.2 µs may also be used.

In addition, channel coding is performed on a physical layer control information bit sequence of HE-SIG1($2^{nd}$) transmission at a coding rate and in a coding scheme that are the same as those of HE-SIG1($1^{st}$). After the channel coding, BPSK constellation mapping (that is, BPSK modulation) is performed on a coded bit sequence, and a modulation sequence is sequentially mapped to even-numbered subcarriers (subcarriers are numbered with 0, 1, 2, . . . , and 63), and signals on odd-numbered subcarriers are zero, where zero-frequency subcarriers and guard subcarriers used to suppress neighboring channel leakage are also padded with zero. Then a time-domain signal whose length is 3.2 µs is formed by using 64-point IFFT. Finally, a CP having a length of 0.8 µs, 1.6 µs, 2.4 µs, 3.2 µs, or the like is added, that is, an HE-SIG1($2^{nd}$) signal in an embodiment shown in FIG. 6 in solution 2 is formed. In the generation process, because the signal is carried only on the even-numbered subcarriers, and the signal on the odd-numbered subcarriers is zero, a signal that is output by using 64-point IFFT is a signal having two completely same segments C and D shown in FIG. 6.

In the prior art, to ensure reliability of physical layer signaling, a lowest order modulation coding scheme (Modulation Coding Scheme, MCS for short), that is, MSC0, by which the physical layer signaling can be reliably transmitted even in a quite low SNR, is generally used to transmit the physical layer signaling. A modulation scheme corresponding to the MSC0 is BPSK, and a channel coding scheme is convolutional coding with a coding rate of 1/2. An SNR gain of 3 dB may be obtained when HE-SIG1($1^{st}$) is received; therefore, more physical layer control information may be transmitted by using channel coding with a higher coding rate without reducing HE-SIG1($1^{st}$) receiving performance. For example, convolutional coding with a coding rate of 2/3, or convolutional coding with a coding rate of 3/4, or channel coding in another form with a coding rate greater than 1/2 is used, for example, LDPC (Low-density parity-check, low-density parity-check) code.

Two cases occur. One is that physical layer control information bits of HE-SIG1($1^{st}$) and HE-SIG1($2^{nd}$) transmission are coded independently of each other. In this case, because HE-SIG1($1^{st}$) has an SNR gain of 3 dB, channel coding with a higher coding rate is used to transmit more physical layer control information; and HE-SIG1($2^{nd}$) uses an OFDM symbol that has a length of 3.2 μs without a CP, where the CP may be a CP having a longer length of 1.6 μs, 2.4 μs, 3.2 μs, or the like. Compared with HE-SIG1($1^{st}$), HE-SIG1($2^{nd}$) does not have an SNR gain of 3 dB, and therefore convolutional coding with a coding rate of 1/2 in the prior art is still used to perform transmission.

The other case is that physical layer control information bits of HE-SIG1($1^{st}$) and HE-SIG1($2^{nd}$) transmission are jointly coded. In this case, HE-SIG1($2^{nd}$) needs to have two similar segments of repeated structures, so as to obtain an SNR gain of 3 dB like HE-SIG1($1^{st}$).

According to this embodiment of the disclosure, the two same consecutive multiple-signal-segments are two same consecutive two-signal-segments, and the generating a physical layer packet of a first protocol version of a wireless local area network includes: generating a modulation sequence; mapping the modulation sequence to even-numbered subcarriers in target subcarriers, where a signal on odd-numbered subcarriers in the target subcarriers is zero; generating the two same consecutive two-signal-segments according to the target subcarriers, where the two same consecutive two-signal-segments comprises a fifth signal segment, a sixth signal segment, the fifth signal segment, and the sixth signal segment in sequence; and generating the physical layer packet according to the two same consecutive two-signal-segments.

Figure 2F:
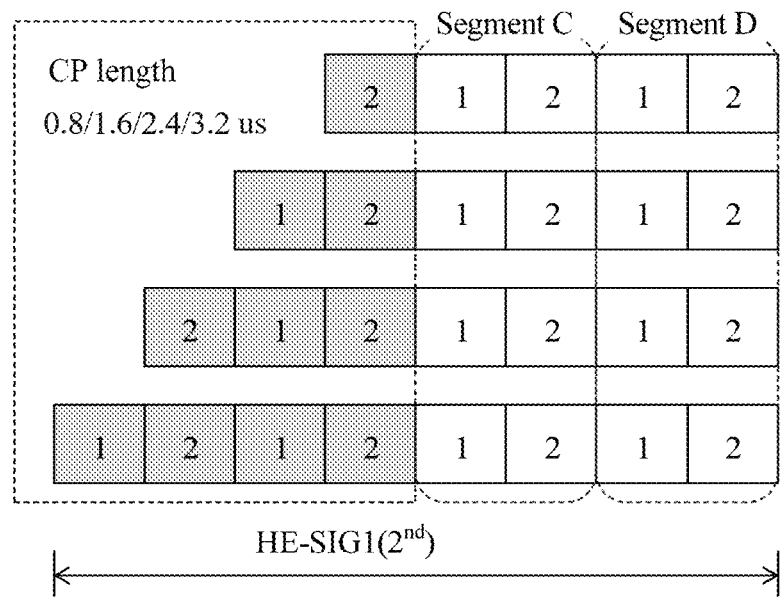
FIG. 2F is a schematic diagram of a generation process of a second signaling field of a physical layer packet according to another embodiment of the disclosure.

For example, description is made with reference to FIG. 2F, and FIG. 2F shows a generation process of HE-SIG1 ($2^{nd}$). Channel coding is performed on a physical layer control information bit sequence of HE-SIG1($2^{nd}$) transmission at a coding rate and in a coding scheme that are the same as those of HE-SIG1($1^{st}$). After the channel coding, BPSK constellation mapping (that is, BPSK modulation) is performed on a coded bit sequence, and a modulation sequence is sequentially mapped to even-numbered subcarriers (subcarriers are numbered with 0, 1, 2, . . . , and 63), and signals on odd-numbered subcarriers are zero, where zero-frequency subcarriers and guard subcarriers used to suppress neighboring channel leakage are also padded with zero. Then a time-domain signal whose length is 3.2 μs is formed by using 64-point IFFT. Finally, a CP having a length of 0.8 μs, 1.6 μs, 2.4 μs, 3.2 μs, or the like is added, that is, an HE-SIG1($2^{nd}$) signal in an embodiment shown in FIG. 2F is formed. In the generation process, because the signal is carried only on the even-numbered subcarriers, and the signal on the odd-numbered subcarriers is zero, a signal that is output by using 64-point IFFT is a signal having two completely same segments C and D shown in FIG. 2F.

According to this embodiment of the disclosure, the two same consecutive multiple-segment-structures are two same consecutive second four-signal-segments, and the generating a physical layer packet of a first protocol version of a wireless local area network includes: generating and determining a second four-signal-segment, where the second four-signal-segment consists of a fifth signal segment, a sixth signal segment, a seventh signal segment, and an eighth signal segment in sequence; generating the two same consecutive second four-signal-segment structures by replicating the second four-signal-segment; and determining the prefix signal segment according to the second four-signal-segment, so as to generate the physical layer packet.

Figure 2G:
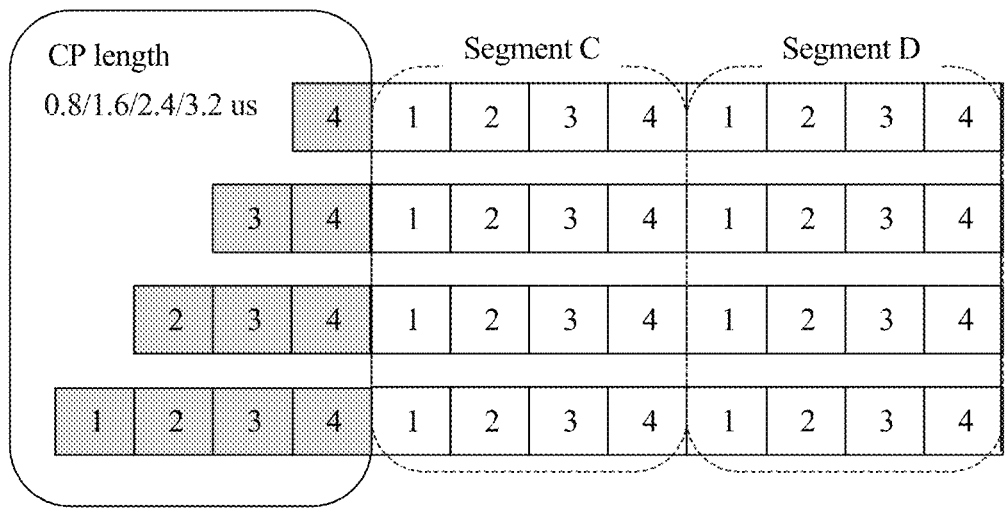
FIG. 2G is a schematic diagram of a generation process of a second signaling field of a physical layer packet according to another embodiment of the disclosure.

Specifically, description is made with reference to FIG. 2Q and FIG. 2G shows a generation process of HE-SIG1 ($2^{nd}$). Similar to the foregoing embodiment, likewise, signals obtained after channel coding and BPSK constellation mapping (that is, BPSK modulation) are sequentially corresponding to subcarriers except zero-frequency subcarriers and guard subcarriers used to suppress neighboring channel leakage. Then a time-domain signal whose length is 3.2 μs is formed by using 64-point IFFT. Afterwards, the signal is repeated once to form a time-domain signal whose length is 6.4 μs. Finally, a CP having a length of 0.8 μs, 1.6 μs, 2.4 μs, 3.2 μs, or the like is added.

According to this embodiment of the disclosure, the generating a physical layer packet of a first protocol version of a wireless local area network includes: generating an initial bit sequence; performing channel coding on the initial bit sequence at a coding rate greater than 1/2; and generating the physical layer packet according to an initial bit sequence on which the channel coding is performed.

According to this embodiment of the disclosure, the generating a physical layer packet of a first protocol version of a wireless local area network includes: generating a bit sequence obtained after the channel coding is performed; and performing binary phase shift keying modulation on the bit sequence, so as to generate the physical layer packet.

Specifically, when a conventional device using the 802.11n protocol receives an 802.11ax packet of a structure shown in FIG. 2A, HE-SIG1($1^{st}$) uses BPSK modulation, the device detects that the first OFDM symbol following a legacy preamble of the packet uses BPSK modulation instead of QBPSK modulation, and therefore does not consider the packet as an 802.11n packet, but considers the packet as an 802.11a packet. In this case, during a transmission period of the 802.11ax packet, the device does not attempt to contend for a channel, which affects ongoing transmission. When a conventional device using the 802.11ac protocol receives an 802.11ax packet of the structure shown in FIG. 2A, the second OFDM symbol of the HE preamble is a cyclic shift copy of HE-SIG1($1^{st}$), and therefore after a CP of 0.8 μs is removed and a time domain is transformed to a frequency domain by using FFT, constellation symbols carried on each subcarrier alternately use BPSK modulation and QBPSK modulation. Therefore, the conventional device using the 802.11ac protocol has two possible judgments. One is that the second OFDM symbol of the HE preamble is determined to use BPSK modulation, and in this case the device does not consider the packet as an 802.11ac packet, but considers the packet as an 802.11a packet. The other is that the second OFDM symbol of the HE preamble is determined to use QBPSK modulation, and in this case the device processes the 802.11ax packet as the 802.11ac packet, that is, considers the first two OFDM symbols of the HE preamble in the structure shown in FIG. 1, that is, HE-SIG1($1^{st}$) and a cyclic shift copy of HE-SIG1 ($1^{st}$), as two OFDM symbols of a VHT-SIG-A field of the 802.11ac protocol to perform demodulation and decoding. Apparently, this leads to a CRC check error of the VHT-SIG-A field with a relatively high possibility. Therefore, as described above, the device attempts to receive or send data only after a delay time, and during this period, does not attempt to contend for a channel. Therefore, regardless of judgment made by the conventional device using the 802.11ac protocol on a modulation scheme for the second OFDM symbol of the HE preamble of the 802.11ax packet in the structure shown in FIG. 2A, the device does not attempt to contend for a channel during a transmission period of the 802.11 ax packet, and as a result, does not affect ongoing transmission. On the other hand, when the 802.11ax device using the structure shown in FIG. 2A receives the 802.11ax packet that uses the structure, a characteristic of two segments A and B of repeated structures in the HE-SIG1($1^{st}$) signal segment may be used to perform repetition comparison in a time domain before FFT, so as to implement fast detection of the 802.11ax packet.

It may be learned that, the HE-SIG1($1^{st}$) signal segment in this embodiment of the disclosure has two segments of repeated structures, that is, the two segments A and B of repeated structures in FIG. 2A. Therefore, these repeated structures may be used when the 802.11ax device using a packet structure in solution 2 performs receiving processing, and the two repeated signal segments, that is, segment A and segment B are combined, so that an SNR gain of 3 dB is obtained when HE-SIG1($1^{st}$) is received.

According to this embodiment of the disclosure, the preamble further includes a copy of the last OFDM symbol of the legacy preamble, the copy follows the legacy preamble and is adjacent to the legacy preamble, and the first signaling field follows the copy and is adjacent to the copy.

It should be understood that, the copy may use any modulation scheme. In the preamble structure, the copy is further included following the legacy preamble, and therefore a repeated structure that is easily recognized by the receive end device is formed. In addition, the first signaling field also has a repeated structure, so that the receive end device can perform recognition more effectively, thereby reliably transmitting data on a channel in a situation such as outdoors.

According to this embodiment of the disclosure, the copy is an OFDM symbol that uses binary phase shift keying modulation. Using the binary phase shift keying modulation scheme enables better compatibility between the 802.11ax device and a device of an earlier version.

According to this embodiment of the disclosure, the preamble further includes a third signaling field that follows and is adjacent to the second signaling field, and the third signaling field includes two same consecutive multiple-signal-segments.

Figure 2H:
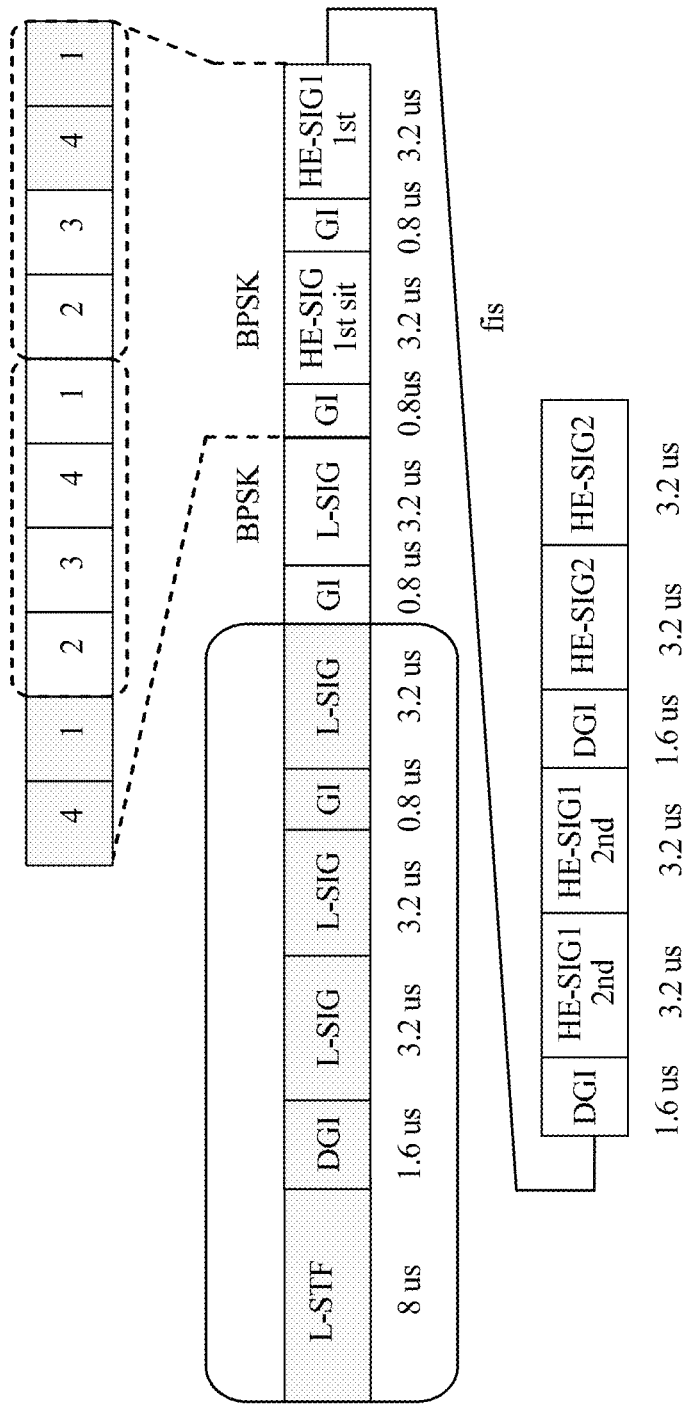
FIG. 2H is a schematic diagram of a preamble of a physical layer packet according to another embodiment of the disclosure.

It should be understood that, in a preamble, a third signaling field and a second signaling field may be the same, or may be different. However, various implementation manners that may be used for the third signaling field are the same as those for the second signaling field. In other words, a structure and a modulation scheme that may be used by the second signaling field are also applicable to the third signaling field. Specifically, FIG. 2H is a schematic diagram of a preamble of a physical layer packet according to another embodiment of the disclosure. In the figure, a copy part uses binary phase shift keying modulation, and a third signaling field is expressed as HE-SIG2.

Figure 3:
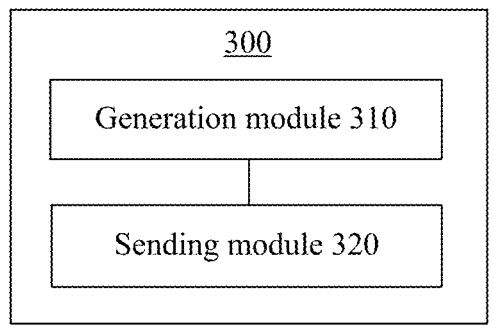
FIG. 3 is a schematic structural diagram of a data transmission apparatus according to another embodiment of the disclosure.

FIG. 3 is a schematic structural diagram of a data transmission apparatus according to another embodiment of the disclosure. An apparatus 300 in FIG. 3 includes:

a generation module 310, configured to generate a physical layer packet of a first protocol version of a wireless local area network, where the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and a sending module 320, configured to send the physical layer packet to a receive end device, so that the receive end device performs recognition.

In this embodiment of the disclosure, a first bit sequence is determined, a physical layer packet is generated according to the first bit sequence, and the physical layer packet is sent to a receive end. A preamble field of the physical layer packet has two same consecutive target four-segment-structures; therefore, 802.11ax devices are well recognized by each other in a WLAN.

According to this embodiment of the disclosure, the sending module is specifically configured to send the physical layer packet to the receive end device, so that the receive end device determines two same consecutive target four-signal-segments in the first signaling field.

According to this embodiment of the disclosure, the first signaling field further includes a suffix, where the suffix is adjacent to the second OFDM symbol, and the suffix is the second signal segment or a cyclic signal segment that includes at least two signal segments, where the cyclic signal segment is based on a circular order of the first signal segment, the second signal segment, the third signal segment, and the fourth signal segment.

According to this embodiment of the disclosure, the generation module is specifically configured to: generate a first four-signal-segment, where the first four-signal-segment consists of the first signal segment, the second signal segment, the third signal segment, and the fourth signal segment in sequence; perform cyclic shift processing on the first four-signal-segment, to obtain a shifted four-signal-segment, where the shifted four-signal-segment consists of the second signal segment, the third signal segment, the fourth signal segment, and the first signal segment in sequence; determine the first signal segment as a prefix of the shifted four-signal-segment; and generate the first signaling field according to the first four-signal-segment and the shifted four-signal-segment, so as to generate the physical layer packet.

According to this embodiment of the disclosure, the generation module is specifically configured to: generate a first four-signal-segment, where the first four-signal-segment consists of the first signal segment, the second signal segment, the third signal segment, and the fourth signal segment in sequence; perform cyclic shift processing on the first four-signal-segment, to obtain a shifted signal segment, where the shifted signal segment consists of the fourth signal segment, the first signal segment, the second signal segment, and the third signal segment in sequence; replicate the shifted signal segment multiple times to obtain a repeated signal segment, where the repeated signal segment is a consecutive arrangement of multiple shifted signal segments; and generate the first signaling field by performing truncation processing on the repeated signal segment, so as to generate the physical layer packet.

According to this embodiment of the disclosure, the preamble further includes a second signaling field that follows and is adjacent to the first signaling field, and the second signaling field includes two same consecutive multiple-signal-segments.

According to this embodiment of the disclosure, the first signaling field and the second signaling field use a same coding scheme.

According to this embodiment of the disclosure, before the two same consecutive multiple-signal-segments, the second signaling field further includes a prefix signal segment, where the prefix signal segment is at least one signal segment at the end of the two same consecutive multiple-signal-segments.

According to this embodiment of the disclosure, the two same consecutive multiple-signal-segments are two same consecutive two-signal-segments, and the generation module is specifically configured to: generate a modulation sequence; map the modulation sequence to even-numbered subcarriers in target subcarriers, where a signal on odd-numbered subcarriers in the target subcarriers is zero; generate the two same consecutive two-signal-segments according to the target subcarriers, where the two same consecutive two-signal-segments comprises a fifth signal segment, a sixth signal segment, the fifth signal segment, and the sixth signal segment in sequence; and generate the physical layer packet according to the two same consecutive two-signal-segments.

According to this embodiment of the disclosure, the two same consecutive multiple-segment-structures are two same consecutive second four-signal-segments, and the generation module is specifically configured to: generate and determine a second four-signal-segment, where the second four-signal-segment consists of a fifth signal segment, a sixth signal segment, a seventh signal segment, and an eighth signal segment in sequence; generate the two same consecutive second four-signal-segment structures by replicating the second four-signal-segment; and determine the prefix signal segment according to the second four-signal-segment, so as to generate the physical layer packet.

According to this embodiment of the disclosure, the generation module is specifically configured to: generate an initial bit sequence; perform channel coding on the initial bit sequence at a coding rate greater than 1/2; and generate the physical layer packet according to an initial bit sequence on which the channel coding is performed.

According to this embodiment of the disclosure, the generation module is specifically configured to: generate a bit sequence obtained after the channel coding is performed; and perform binary phase shift keying modulation on the bit sequence, so as to generate the physical layer packet.

According to this embodiment of the disclosure, the preamble further includes a copy of the last OFDM symbol of the legacy preamble, the copy follows the legacy preamble and is adjacent to the legacy preamble, and the first signaling field follows the copy and is adjacent to the copy.

According to this embodiment of the disclosure, the copy is an OFDM symbol that uses binary phase shift keying modulation.

According to this embodiment of the disclosure, the preamble further includes a third signaling field that follows and is adjacent to the second signaling field, and the third signaling field includes two same consecutive multiple-signal-segments.

According to this embodiment of the disclosure, the apparatus is a user station or an access point.

Operations of the modules of the apparatus in FIG. 3 are corresponding to the method in FIG. 2, and details are not described herein.

Figure 4:
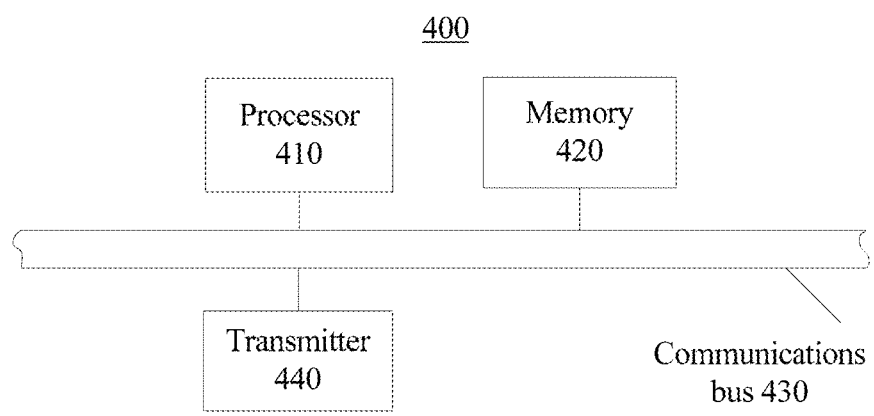
FIG. 4 is a schematic structural diagram of a data transmission apparatus according to another embodiment of the disclosure.

FIG. 4 is a schematic structural diagram of a data transmission apparatus according to another embodiment of the disclosure. An apparatus 400 in FIG. 4 includes: a processor 410, a memory 420, a communications bus 430, and a transmitter 940.

The processor 410 invokes code in the memory 420 by using the communications bus 430, so as to generate a physical layer packet of a first protocol version of a wireless local area network, where the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence.

The transmitter 940 sends the physical layer packet to a receive end device, so that the receive end device performs recognition.

In this embodiment of the disclosure, a first bit sequence is determined, a physical layer packet is generated according to the first bit sequence, and the physical layer packet is sent to a receive end. A preamble field of the physical layer packet has two same consecutive target four-segment-structures; therefore, 802.111ax devices are well recognized by each other in a WLAN.

According to this embodiment of the disclosure, the processor 410 is specifically configured to send the physical layer packet to the receive end device, so that the receive end device determines two same consecutive target four-signal-segments in the first signaling field.

According to this embodiment of the disclosure, the first signaling field further includes a suffix, where the suffix is adjacent to the second OFDM symbol, and the suffix is the second signal segment or a cyclic signal segment that includes at least two signal segments, where the cyclic signal segment is based on a circular order of the first signal segment, the second signal segment, the third signal segment, and the fourth signal segment.

According to this embodiment of the disclosure, the processor 410 is specifically configured to: generate a first four-signal-segment, where the first four-signal-segment consists of the first signal segment, the second signal segment, the third signal segment, and the fourth signal segment in sequence; perform cyclic shift processing on the first four-signal-segment, to obtain a shifted four-signal-segment, where the shifted four-signal-segment consists of the second signal segment, the third signal segment, the fourth signal segment, and the first signal segment in sequence; determine the first signal segment as a prefix of the shifted four-signal-segment; and generate the first signaling field according to the first four-signal-segment and the shifted four-signal-segment, so as to generate the physical layer packet.

According to this embodiment of the disclosure, the processor 410 is specifically configured to: generate a first four-signal-segment, where the first four-signal-segment consists of the first signal segment, the second signal segment, the third signal segment, and the fourth signal segment in sequence; perform cyclic shift processing on the first four-signal-segment, to obtain a shifted signal segment, where the shifted signal segment consists of the fourth signal segment, the first signal segment, the second signal segment, and the third signal segment in sequence; replicate the shifted signal segment multiple times to obtain a repeated signal segment, where the repeated signal segment is a consecutive arrangement of multiple shifted signal segments; and generate the first signaling field by performing truncation processing on the repeated signal segment, so as to generate the physical layer packet.

According to this embodiment of the disclosure, the preamble further includes a second signaling field that follows and is adjacent to the first signaling field, and the second signaling field includes two same consecutive multiple-signal-segments.

According to this embodiment of the disclosure, the first signaling field and the second signaling field use a same coding scheme.

According to this embodiment of the disclosure, before the two same consecutive multiple-signal-segments, the second signaling field further includes a prefix signal segment, where the prefix signal segment is at least one signal segment at the end of the two same consecutive multiple-signal-segments.

According to this embodiment of the disclosure, the two same consecutive multiple-signal-segments are two same consecutive two-signal-segments.

The processor 410 is specifically configured to: generate a modulation sequence; map the modulation sequence to even-numbered subcarriers in target subcarriers, where a signal on odd-numbered subcarriers in the target subcarriers is zero; generate the two same consecutive two-signal-segments according to the target subcarriers, where the two same consecutive two-signal-segments comprises a fifth signal segment, a sixth signal segment, the fifth signal segment, and the sixth signal segment in sequence; and generate the physical layer packet according to the two same consecutive two-signal-segments.

According to this embodiment of the disclosure, the two same consecutive multiple-segment-structures are two same consecutive second four-signal-segments.

The processor 410 is specifically configured to: generate and determine a second four-signal-segment, where the second four-signal-segment consists of a fifth signal segment, a sixth signal segment, a seventh signal segment, and an eighth signal segment in sequence; generate the two same consecutive second four-signal-segment structures by replicating the second four-signal-segment; and determine the prefix signal segment according to the second four-signal-segment, so as to generate the physical layer packet.

According to this embodiment of the disclosure, the processor 410 is specifically configured to: generate an initial bit sequence; perform channel coding on the initial bit sequence at a coding rate greater than 1/2; and generate the physical layer packet according to an initial bit sequence on which the channel coding is performed.

According to this embodiment of the disclosure, the processor 410 is specifically configured to: generate a bit sequence obtained after the channel coding is performed; and perform binary phase shift keying modulation on the bit sequence, so as to generate the physical layer packet.

According to this embodiment of the disclosure, the preamble further includes a copy of the last OFDM symbol of the legacy preamble, the copy follows the legacy preamble and is adjacent to the legacy preamble, and the first signaling field follows the copy and is adjacent to the copy.

According to this embodiment of the disclosure, the copy is an OFDM symbol that uses binary phase shift keying modulation.

According to this embodiment of the disclosure, the preamble further includes a third signaling field that follows and is adjacent to the second signaling field, and the third signaling field includes two same consecutive multiple-signal-segments.

According to this embodiment of the disclosure, the apparatus is a user station or an access point.

Operations of the modules of the apparatus in FIG. 4 are corresponding to the method in FIG. 2, and details are not described herein.

Figure 5:
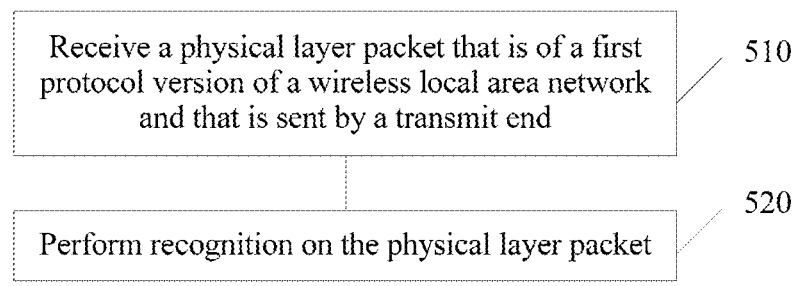
FIG. 5 is a schematic flowchart of a data transmission method according to another embodiment of the disclosure.

FIG. 5 is a schematic flowchart of a data transmission method according to another embodiment of the disclosure. A method 500 in FIG. 5 includes the following steps:

510. Receive a physical layer packet that is of a first protocol version of a wireless local area network and that is sent by a transmit end, where the physical layer packet is generated by the transmit end, the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence.

520. Perform recognition on the physical layer packet.

It should be understood that, optionally, in the method, binary phase shift keying demodulation may further be performed on the first signaling field and the second signaling field independently or jointly. Optionally, the method may further include performing channel decoding on the first signaling field and the second signaling field independently or jointly at a decoding rate equal to 1/2 or greater than 1/2.

In this embodiment of the disclosure, a first bit sequence is determined, a physical layer packet is generated according to the first bit sequence, and the physical layer packet is sent to a receive end. A preamble field of the physical layer packet has two same consecutive target four-segment-structures; therefore, 802.11ax devices are well recognized by each other in a WLAN.

According to this embodiment of the disclosure, the performing recognition on the physical layer packet includes: determining two same consecutive target foursignal-segments in the first signaling field. It should be understood that, the two same consecutive target four-signal-segments may be determined in various manners, including a power detection manner and another manner.

According to this embodiment of the disclosure, the determining two same consecutive target four-signal-segments in the first signaling field includes: determining the two same consecutive target four-signal-segments in the first signaling field by detecting signal power or noise power.

For example, the following formulas (1) to (4) provide several determining variables that may be used in this embodiment of the disclosure for repetition detection of two segments of signals:

$$J_1 = \frac{1}{K} \sum_{k=1}^{K} [(I_{1k} - I_{2k})^2 + (Q_{1k} - Q_{2k})^2] \quad (1)$$

$$J_2 = \text{Re}[E] = \frac{1}{K} \sum_{k=1}^{K} (I_{1k} I_{2k} + Q_{1k} Q_{2k}) \quad (2)$$

$$J_3 = \frac{\text{Re}[E]}{|\text{Im}[E]|} = \frac{\sum_{k=1}^{K} (I_{1k} I_{2k} + Q_{1k} Q_{2k})}{\left| \sum_{k=1}^{K} (I_{2k} Q_{1k} - I_{1k} Q_{2k}) \right|} \quad (3)$$

$$J_4 = \text{Re}[E]/J_1 = \frac{\sum_{k=1}^{K} (I_{1k} I_{2k} + Q_{1k} Q_{2k})}{\sum_{k=1}^{K} [(I_{1k} - I_{2k})^2 + (Q_{1k} - Q_{2k})^2]} \quad (4)$$

where:

$$E = \frac{1}{K} \sum_{k=1}^{K} (I_{1k} + jQ_{1k})(I_{2k} - jQ_{2k}) =$$

$$\frac{1}{K} \sum_{k=1}^{K} (I_{1k} I_{2k} + Q_{1k} Q_{2k}) + j \frac{1}{K} \sum_{k=1}^{K} (I_{2k} Q_{1k} - I_{1k} Q_{2k})$$

Operators Re and Im respectively indicate a real part and an imaginary part that are of a complex number, $I_{1k}$ and $Q_{1k}$ are respectively a real part and an imaginary part that are of a $k^{th}$ sampling point of a first signal segment in the two signal segments, that is, an in-phase (In-phase) component and a quadrature phase (Quadrature phase) component, and $I_{2k}$ and $Q_{2k}$ are respectively a real part and an imaginary part that are of a $k^{th}$ sampling point of a second signal segment in the two signal segments; and summation is performed on all the $K^{th}$ sampling points of all signal segments. For example, for a determining variable shown in formula (1), if the two signal segments have a repeated structure, a value obtained according to formula (1) is close to noise power, or if the two signal segments do not have a repeated structure, a value obtained according to formula (1) is far greater than noise power, and therefore, whether the two signal segments have a repeated structure is determined according to this. For another example, for a determining variable shown in formula (2), if the two signal segments have a repeated structure, a value obtained according to formula (1) is close to signal power, or if the two signal segments do not have a repeated structure, a value obtained according to formula (1) is far less than signal power, and therefore, whether the two signal segments have a repeated structure is determined according to this.

According to this embodiment of the disclosure, the first signaling field further includes a suffix, where the suffix is adjacent to the second OFDM symbol, and the suffix is the second signal segment or a cyclic signal segment that includes at least two signal segments, where the cyclic signal segment is based on a circular order of the first signal segment, the second signal segment, the third signal segment, and the fourth signal segment.

Optionally, as another embodiment, the method further includes: performing combination processing on the two same consecutive target four-signal-segments, so as to perform demodulation processing and decoding processing.

Figure 5A:
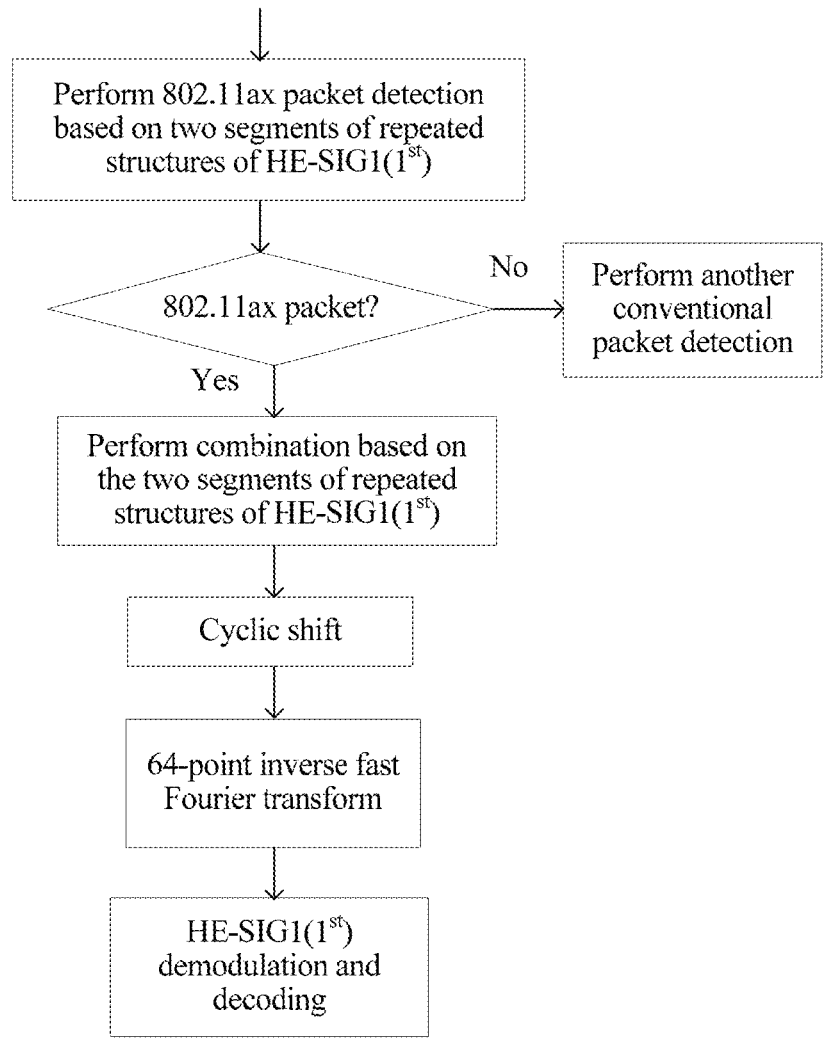
FIG. 5A is a schematic diagram of a receiving process of a first signaling field of a physical layer packet according to another embodiment of the disclosure.

Specifically, FIG. 5A is a receiving processing process when HE-SIG1($1^{st}$) is coded independently. After 802.11ax packet detection is performed based on two segments of repeated structures of HE-SIG1($1^{st}$), if it is determined that the 802.11ax packet is in a corresponding preamble transmission format, two segments of repeated signals of HE-SIG1($1^{st}$), that is, two signal segments A and B, are combined to form a signal having a length of 3.2 μs. For cases of three embodiments shown in FIG. 2A, cyclic shift is further performed according to a corresponding preamble transmission format to obtain a 3.2 μs signal consisting of segments that are numbered with 1, 2, 3, and 4 in sequence in a time sequence. For example, for a case in which there is no suffix, there is a suffix having a length of 0.8 μs, and there is a suffix having a length of 1.6 μs, before CPs having respective lengths of 1.6 μs, 2.4 μs, and 3.2 μs are respectively removed, to obtain a signal that has a length of 3.2 μs and that consists of segments 2, 3, 4, and 1, segments 3, 4, 1, and 2, and segments 4, 1, 2, and 3 that are of HE-SIG1($1^{st}$), which are cyclically shifted rightward by one segment, cyclically shifted rightward by two segments, and cyclically shifted leftward by one segment respectively to obtain a signal consisting of segments 1, 2, 3, and 4 of HE-SIG1($1^{st}$) in sequence in a time sequence. Afterwards, a time domain is transformed to a frequency domain by using 64-point FFT, and demodulation processing and decoding processing are performed on HE-SIG1($1^{st}$). If HE-SIG1($1^{st}$) uses channel coding that has a higher rate than existing convolutional coding with a coding rate of 1/2, corresponding channel decoding processing is performed for a used channel coding scheme with a higher coding rate.

According to this embodiment of the disclosure, the preamble further includes a second signaling field that follows and is adjacent to the first signaling field, and the second signaling field includes two same consecutive multiple-signal-segments.

According to this embodiment of the disclosure, the first signaling field and the second signaling field use a same decoding scheme.

It should be understood that, a used same decoding scheme is corresponding to a coding scheme of a signaling field. The decoding scheme may be any decoding scheme. Preferably, both the first signaling field and the second signaling field use a coding scheme with a coding rate greater than 1/2. Because the two signaling fields may be jointly coded and decoded, both the first signaling field and the second signaling field obtain an SNR gain of 3 dB. In addition, recognition between 802.11ax devices, and error correction strength generated when the 802.11ax device coexists with another device of an earlier version may be further supported.

According to this embodiment of the disclosure, before the two same consecutive multiple-signal-segments, the second signaling field further includes a prefix signal segment, where the prefix signal segment is at least one signal segment at the end of the two same consecutive multiple-signal-segments.

Optionally, as another embodiment, the method further includes: removing the prefix signal segment according to the physical layer packet, to obtain the two same consecutive multiple-signal-segments; and performing combination on the two same consecutive multiple-signal-segments, so as to perform demodulation processing and decoding processing.

Figure 5B:
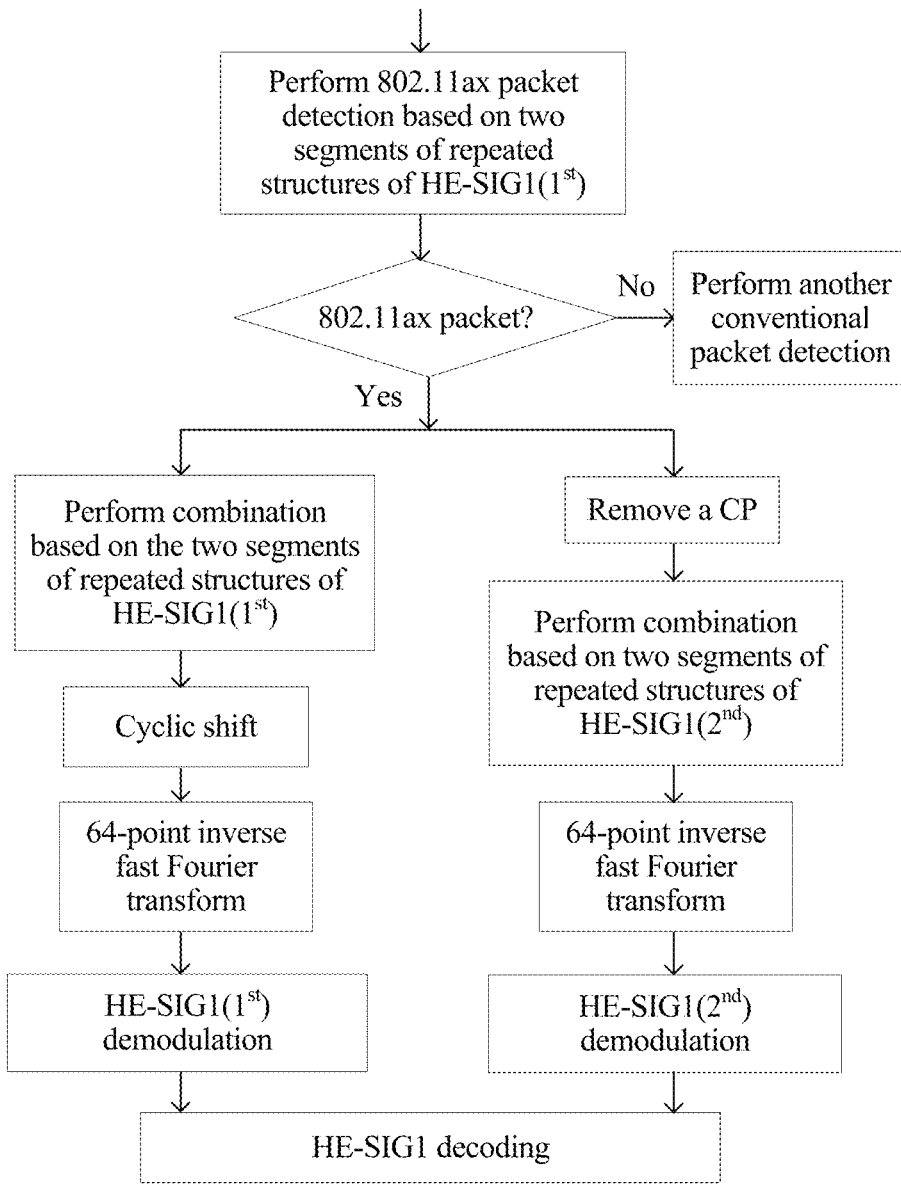
FIG. 5B is a schematic diagram of a receiving process of a first signaling field and a second signaling field that are of a physical layer packet according to another embodiment of the disclosure.
Figure 7:
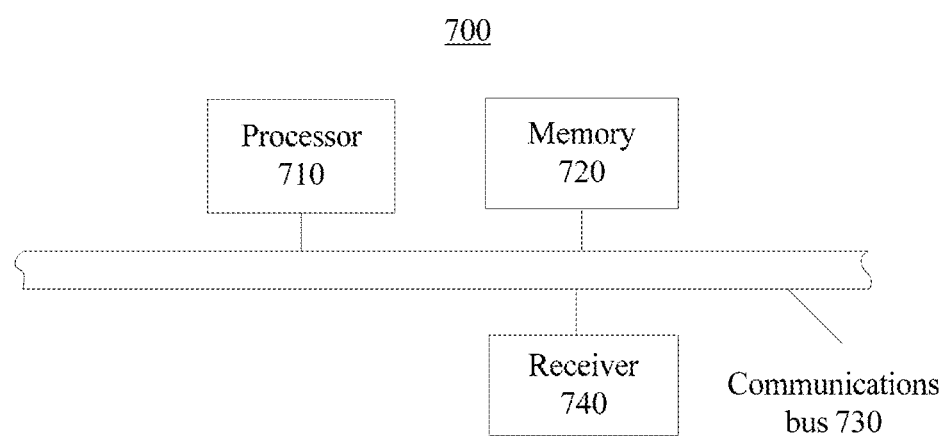
FIG. 7 is a schematic structural diagram of a data transmission apparatus according to another embodiment of the disclosure.

Specifically, description is made with reference to FIG. 5B. FIG. 5B is a receiving processing process when HE-SIG1($1^{st}$) and HE-SIG1($2^{nd}$) are jointly coded. First, during 802.11ax packet detection, two segments of repeated structures of both HE-SIG1($1^{st}$) and HE-SIG1($2^{nd}$) may be used to perform repetition detection, so as to obtain more accurate and reliable determining. After the 802.11ax packet detection, if it is determined that the 802.11ax packet is in a corresponding preamble transmission format, for HE-SIG1 ($1^{st}$), a processing process that is the same as that in FIG. 5A is used to complete demodulation processing of HE-SIG1 ($1^{st}$); for receiving of HE-SIG1($2^{nd}$), when an HE-SIG1($2^{nd}$) signal structure shown in FIG. 5B is used, after a CP having a corresponding length is removed, a time domain is directly transformed to a frequency domain by using 64-point FFT, and a signal on even-numbered subcarriers is obtained to perform BPSK demodulation; when an HE-SIG1($2^{nd}$) signal structure shown in FIG. 2G is used, after a CP having a corresponding length is removed, two segments of repeated signals whose lengths are 3.2 μs each, that is, segment C and segment D in FIG. 7, are combined, and then a time domain is transformed to a frequency domain by using the 64-point FFT, and a signal on each subcarrier is obtained to perform BPSK demodulation. Finally, decoding processing is performed on an entire HE-SIG1 field. If HE-SIG1($1^{st}$) and HE-SIG1($2^{nd}$) use channel coding that has a higher rate than existing convolutional coding with a coding rate of 1/2, corresponding channel decoding processing is performed for a used channel coding scheme with a higher coding rate.

Optionally, as another embodiment, the method further includes: performing channel decoding at a decoding rate greater than 1/2 according to the two same consecutive target four-signal-segments.

Optionally, as another embodiment, the method further includes: performing binary phase shift keying demodulation according to the two same consecutive target four-signal-segments.

According to this embodiment of the disclosure, the preamble further includes a copy of the last OFDM symbol of the legacy preamble, the copy follows the legacy preamble and is adjacent to the legacy preamble, and the first signaling field follows the copy and is adjacent to the copy.

According to this embodiment of the disclosure, the copy is an OFDM symbol that uses binary phase shift keying modulation.

According to this embodiment of the disclosure, the preamble further includes a third signaling field that follows and is adjacent to the second signaling field, and the third signaling field includes two same consecutive multiple-signal-segments.

Figure 6:
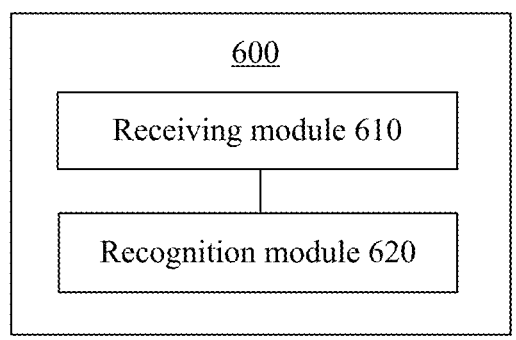
FIG. 6 is a schematic structural diagram of a data transmission apparatus according to another embodiment of the disclosure.

FIG. 6 is a schematic structural diagram of a data transmission apparatus according to another embodiment of the disclosure. An apparatus 600 in FIG. 6 includes:

a receiving module 610, configured to receive a physical layer packet that is of a first protocol version of a wireless local area network and that is sent by a transmit end device, where the physical layer packet is generated by the transmit end device, the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and a recognition module 620, configured to perform recognition on the physical layer packet.

In this embodiment of the disclosure, a first bit sequence is determined, a physical layer packet is generated according to the first bit sequence, and the physical layer packet is sent to a receive end. A preamble field of the physical layer packet has two same consecutive target four-segment-structures; therefore, 802.11ax devices are well recognized by each other in a WLAN.

According to this embodiment of the disclosure, the recognition module is specifically configured to determine two same consecutive target four-signal-segments in the first signaling field.

According to this embodiment of the disclosure, the recognition module is specifically configured to determine the two same consecutive target four-signal-segments in the first signaling field by detecting signal power or noise power.

According to this embodiment of the disclosure, the first signaling field further includes a suffix, where the suffix is adjacent to the second OFDM symbol, and the suffix is the second signal segment or a cyclic signal segment that includes at least two signal segments, where the cyclic signal segment is based on a circular order of the first signal segment, the second signal segment, the third signal segment, and the fourth signal segment.

Optionally, as another embodiment, the apparatus further includes: a first combination module, configured to perform combination processing on the two same consecutive target four-signal-segments, so as to perform demodulation processing and decoding processing.

According to this embodiment of the disclosure, the preamble further includes a second signaling field that follows and is adjacent to the first signaling field, and the second signaling field includes two same consecutive multiple-signal-segments.

According to this embodiment of the disclosure, the first signaling field and the second signaling field use a same decoding scheme.

According to this embodiment of the disclosure, before the two same consecutive multiple-signal-segments, the second signaling field further includes a prefix signal segment, where the prefix signal segment is at least one signal segment at the end of the two same consecutive multiple-signal-segments.

Optionally, as another embodiment, the apparatus further includes: a removing module, configured to remove the prefix signal segment according to the physical layer packet, to obtain the two same consecutive multiple-signal-segments; and a second combination module, configured to perform combination on the two same consecutive multiple-signal-segments, so as to perform demodulation processing and decoding processing.

Optionally, as another embodiment, the apparatus further includes: a decoding module, configured to perform channel decoding at a decoding rate greater than 1/2 according to the two same consecutive target four-signal-segments.

Optionally, as another embodiment, the apparatus further includes: a demodulation module, configured to perform binary phase shift keying demodulation according to the two same consecutive target four-signal-segments.

According to this embodiment of the disclosure, the preamble further includes a copy of the last OFDM symbol of the legacy preamble, the copy follows the legacy preamble and is adjacent to the legacy preamble, and the first signaling field follows the copy and is adjacent to the copy.

According to this embodiment of the disclosure, the copy is an OFDM symbol that uses binary phase shift keying modulation.

According to this embodiment of the disclosure, the preamble further includes a third signaling field that follows and is adjacent to the second signaling field, and the third signaling field includes two same consecutive multiple-signal-segments.

According to this embodiment of the disclosure, the apparatus is a user station or an access point.

Operations of the modules of the apparatus in FIG. 6 are corresponding to the method in FIG. 5, and details are not described herein.

FIG. 7 is a schematic structural diagram of a data transmission apparatus according to another embodiment of the disclosure. An apparatus 700 in FIG. 7 includes: a processor 710, a memory 720, a communications bus 730, and a receiver 740.

The receiver 740 receives a physical layer packet that is of a first protocol version of a wireless local area network and that is sent by a transmit end device, where the physical layer packet is generated by the transmit end device, the physical layer packet includes a preamble, the preamble includes at least a legacy preamble that complies with a second protocol version of the wireless local area network and a first signaling field following the legacy preamble, the first signaling field includes at least two OFDM symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence.

The processor 710 invokes code in the memory 720 by using the communications bus 730, so as to perform recognition on the physical layer packet.

In this embodiment of the disclosure, a first bit sequence is determined, a physical layer packet is generated according to the first bit sequence, and the physical layer packet is sent to a receive end. A preamble field of the physical layer packet has two same consecutive target four-segment-structures; therefore, 802.11ax devices are well recognized by each other in a WLAN.

According to this embodiment of the disclosure, the processor 710 is specifically configured to determine two same consecutive target four-signal-segments in the first signaling field.

According to this embodiment of the disclosure, the processor 710 is specifically configured to determine the two same consecutive target four-signal-segments in the first signaling field by detecting signal power or noise power.

According to this embodiment of the disclosure, the first signaling field further includes a suffix, where the suffix is adjacent to the second OFDM symbol, and the suffix is the second signal segment or a cyclic signal segment that includes at least two signal segments, where the cyclic signal segment is based on a circular order of the first signal segment, the second signal segment, the third signal segment, and the fourth signal segment.

According to this embodiment of the disclosure, the processor 710 is further configured to perform combination processing on the two same consecutive target four-signal-segments, so as to perform demodulation processing and decoding processing.

According to this embodiment of the disclosure, the preamble further includes a second signaling field that follows and is adjacent to the first signaling field, and the second signaling field includes two same consecutive multiple-signal-segments.

According to this embodiment of the disclosure, the first signaling field and the second signaling field use a same decoding scheme.

According to this embodiment of the disclosure, before the two same consecutive multiple-signal-segments, the second signaling field further includes a prefix signal segment, where the prefix signal segment is at least one signal segment at the end of the two same consecutive multiple-signal-segments.

According to this embodiment of the disclosure, the processor 710 is further configured to remove the prefix signal segment according to the physical layer packet, to obtain the two same consecutive multiple-signal-segments; and perform combination on the two same consecutive multiple-signal-segments, so as to perform demodulation processing and decoding processing.

According to this embodiment of the disclosure, the processor 710 is further configured to:

perform channel decoding at a decoding rate greater than 1/2 according to the two same consecutive target four-signal-segments.

According to this embodiment of the disclosure, the processor 710 is further configured to:

perform binary phase shift keying demodulation according to the two same consecutive target four-signal-segments.

According to this embodiment of the disclosure, the preamble further includes a copy of the last OFDM symbol of the legacy preamble, the copy follows the legacy preamble and is adjacent to the legacy preamble, and the first signaling field follows the copy and is adjacent to the copy.

According to this embodiment of the disclosure, the copy is an OFDM symbol that uses binary phase shift keying modulation.

According to this embodiment of the disclosure, the preamble further includes a third signaling field that follows and is adjacent to the second signaling field, and the third signaling field includes two same consecutive multiple-signal-segments.

According to this embodiment of the disclosure, the apparatus is a user station or an access point.

Operations of the modules of the apparatus in FIG. 7 are corresponding to the method in FIG. 5, and details are not described herein.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the disclosure, "B corresponding to A" indicates that B is associated with A and that B may be determined according to A. However, it should further be understood that determining B according to A does not mean that B is determined only according to A, and B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the disclosure.

In addition, functional units in the embodiments of the disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the disclosure may be implemented by hardware, firmware or a combination thereof. When the disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included a definition of a medium to which they belong. For example, a disk and disc used by the disclosure include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the disclosure, but is not intended to limit the protection scope of the disclosure. Any modification, equivalent replacement, or improvement made without departing from the spirit and principle of the disclosure shall fall within the protection scope of the disclosure.

What is claimed is:

1. A data transmission method, the method comprising:
generating a physical layer packet of a first protocol version of a wireless local area network, wherein the physical layer packet comprises a preamble, the preamble comprises at least a legacy preamble that complies with a second protocol version of the wireless local area network and a first signaling field following the legacy preamble, the first signaling field comprises at least two orthogonal frequency division multiplexing (OFDM) symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and
sending the physical layer packet to a receive end device, to enable the receive end device to perform recognition of a transmit end device.

2. The method according to claim 1, wherein the sending the physical layer packet to a receive end device, to enable the receive end device to perform recognition comprises:
sending the physical layer packet to the receive end device, to enable the receive end device to determine two same consecutive target four-signal-segments in the first signaling field.

3. The method according to claim 1, wherein the first signaling field further comprises a suffix, the suffix is adjacent to the second OFDM symbol, and the suffix is the second signal segment or a cyclic signal segment that comprises at least two signal segments, wherein the cyclic signal segment is based on a circular order of the first signal segment, the second signal segment, the third signal segment, and the fourth signal segment.

4. The method according to claim 3, wherein the generating a physical layer packet of a first protocol version of a wireless local area network comprises:
   generating a first four-signal-segment, wherein the first four-signal-segment consists of the first signal segment, the second signal segment, the third signal segment, and the fourth signal segment in sequence;
   performing cyclic shift processing on the first four-signal-segment, to obtain a shifted four-signal-segment, wherein the shifted four-signal-segment consists of the second signal segment, the third signal segment, the fourth signal segment, and the first signal segment in sequence;
   determining the first signal segment as a prefix of the shifted four-signal-segment; and
   generating the first signaling field according to the first four-signal-segment and the shifted four-signal-segment, so as to generate the physical layer packet.

5. The method according to claim 3, wherein the generating a physical layer packet of a first protocol version of a wireless local area network comprises:
   generating a first four-signal-segment, wherein the first four-signal-segment consists of the first signal segment, the second signal segment, the third signal segment, and the fourth signal segment in sequence;
   performing cyclic shift processing on the first four-signal-segment, to obtain a shifted signal segment, wherein the shifted signal segment consists of the fourth signal segment, the first signal segment, the second signal segment, and the third signal segment in sequence;
   replicating the shifted signal segment multiple times to obtain a repeated signal segment, wherein the repeated signal segment is a consecutive arrangement of multiple shifted signal segments; and
   generating the first signaling field by performing truncation processing on the repeated signal segment, so as to generate the physical layer packet.

6. A data transmission method comprising:
   receiving a physical layer packet that is of a first protocol version of a wireless local area network and that is sent by a transmit end device, wherein the physical layer packet is generated by the transmit end device, the physical layer packet comprises a preamble, the preamble comprises at least a legacy preamble that complies with a second protocol version of the wireless local area network and a first signaling field following the legacy preamble, the first signaling field comprises at least two orthogonal frequency division multiplexing (OFDM) symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and
   performing recognition on the physical layer packet to recognize the transmit end device.

7. The method according to claim 6, wherein the performing recognition on the physical layer packet comprises:
   determining two same consecutive target four-signal-segments in the first signaling field.

8. The method according to claim 7, wherein the determining two same consecutive target four-signal-segments in the first signaling field comprises:
   determining the two same consecutive target four-signal-segments in the first signaling field by detecting signal power or noise power.

9. The method according to claim 6, wherein the first signaling field further comprises a suffix, the suffix is adjacent to the second OFDM symbol, and the suffix is the second signal segment or a cyclic signal segment that comprises at least two signal segments, wherein the cyclic signal segment is based on a circular order of the first signal segment, the second signal segment, the third signal segment, and the fourth signal segment.

10. The method according to claim 6, further comprising:
    performing combination processing on the two same consecutive target four-signal-segments, so as to perform demodulation processing and decoding processing.

11. A data transmission apparatus comprising:
    a processor configured to generate a physical layer packet of a first protocol version of a wireless local area network, wherein the physical layer packet comprises a preamble, the preamble comprises at least a legacy preamble that complies with a second protocol version of the wireless local area network and a first signaling field following the legacy preamble, the first signaling field comprises at least two orthogonal frequency division multiplexing (OFDM) symbols, the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and
    a transmitter configured to send the physical layer packet to a receive end device, to enable the receive end device to perform recognition of the data transmission apparatus.

12. The apparatus according to claim 11, wherein transmitter is configured to send the physical layer packet to the receive end device, to enable the receive end device to determine two same consecutive target four-signal-segments in the first signaling field.

13. The apparatus according to claim 11, wherein the first signaling field further comprises a suffix, the suffix is adjacent to the second OFDM symbol, and the suffix is the second signal segment or a cyclic signal segment that comprises at least two signal segments, wherein the cyclic signal segment is based on a circular order of the first signal segment, the second signal segment, the third signal segment, and the fourth signal segment.

14. The apparatus according to claim 13, wherein the processor is configured to:
- generate a first four-signal-segment, wherein the first four-signal-segment consists of the first signal segment, the second signal segment, the third signal segment, and the fourth signal segment in sequence;
- perform cyclic shift processing on the first four-signal-segment, to obtain a shifted four-signal-segment, wherein the shifted four-signal-segment consists of the second signal segment, the third signal segment, the fourth signal segment, and the first signal segment in sequence;
- determine the first signal segment as a prefix of the shifted four-signal-segment; and
- generate the first signaling field according to the first four-signal-segment and the shifted four-signal-segment, so as to generate the physical layer packet.

15. The apparatus according to claim 13, wherein the processor is configured to:
- generate a first four-signal-segment, wherein the first four-signal-segment consists of the first signal segment, the second signal segment, the third signal segment, and the fourth signal segment in sequence;
- perform cyclic shift processing on the first four-signal-segment, to obtain a shifted signal segment, wherein the shifted signal segment consists of the fourth signal segment, the first signal segment, the second signal segment, and the third signal segment in sequence;
- replicate the shifted signal segment multiple times to obtain a repeated signal segment, wherein the repeated signal segment is a consecutive arrangement of multiple shifted signal segments; and
- generate the first signaling field by performing truncation processing on the repeated signal segment, so as to generate the physical layer packet.

16. A data transmission apparatus comprising:
- a receiver configured to receive a physical layer packet that is of a first protocol version of a wireless local area network and that is sent by a transmit end device, wherein the physical layer packet is generated by the transmit end device, the physical layer packet comprises a preamble, the preamble comprises at least a legacy preamble that complies with a second protocol version of the wireless local area network and a first signaling field following the legacy preamble, the first signaling field comprises at least two orthogonal frequency division multiplexing (OFDM) symbols, the first two OFDM symbols of the first signaling field each comprises five signal segments, and duration of each signal segment is 0.8 microseconds; and five signal segments of a first OFDM symbol are respectively a fourth signal segment, a first signal segment, a second signal segment, a third signal segment, and the fourth signal segment in sequence, and five signal segments of a second OFDM symbol are respectively the first signal segment, the second signal segment, the third signal segment, the fourth signal segment, and the first signal segment in sequence; and
- a processor configured to perform recognition on the physical layer packet to recognize the transmit end device.

17. The apparatus according to claim 16, wherein the processor is configured to determine two same consecutive target four-signal-segments in the first signaling field.

18. The apparatus according to claim 16, wherein the processor is configured to determine the two same consecutive target four-signal-segments in the first signaling field by detecting signal power or noise power.

19. The apparatus according to claim 16, wherein the first signaling field further comprises a suffix, the suffix is adjacent to the second OFDM symbol, and the suffix is the second signal segment or a cyclic signal segment that comprises at least two signal segments, wherein the cyclic signal segment is based on a circular order of the first signal segment, the second signal segment, the third signal segment, and the fourth signal segment.

20. The apparatus according to claim 16, wherein the processor is further:
- configured to perform combination processing on the two same consecutive target four-signal-segments, so as to perform demodulation processing and decoding processing.

* * * * *